(12) United States Patent
Bozio et al.

(10) Patent No.: US 8,815,383 B2
(45) Date of Patent: Aug. 26, 2014

(54) COMPONENT HAVING A CUSHIONED REGION AND METHOD FOR MAKING A COMPONENT HAVING A CUSHIONED REGION

(75) Inventors: Ronald A. Bozio, Holland, MI (US); Timothy J. Spahr, Zeeland, MI (US); Scott A. Hansen, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 580 days.

(21) Appl. No.: 12/523,593

(22) PCT Filed: Jan. 16, 2008

(86) PCT No.: PCT/US2008/051170
§ 371 (c)(1),
(2), (4) Date: Mar. 16, 2010

(87) PCT Pub. No.: WO2008/089238
PCT Pub. Date: Jul. 24, 2008

(65) Prior Publication Data
US 2010/0215941 A1 Aug. 26, 2010

Related U.S. Application Data

(60) Provisional application No. 60/881,102, filed on Jan. 18, 2007.

(51) Int. Cl.
*B32B 3/26* (2006.01)
*B32B 5/18* (2006.01)
*B29C 44/34* (2006.01)
*B29C 44/06* (2006.01)

(52) U.S. Cl.
CPC ............ *B29C 44/3496* (2013.01); *B29C 44/06* (2013.01); *B32B 5/18* (2013.01)
USPC ..................................... 428/304.4; 156/79

(58) Field of Classification Search
None
See application file for complete search history.

(56) References Cited

U.S. PATENT DOCUMENTS

| 4,268,557 A | * | 5/1981 | Bracesco | 428/71 |
| 6,868,626 B1 | * | 3/2005 | Linkous | 38/102.91 |
| 2004/0229013 A1 | * | 11/2004 | Dooley et al. | 428/138 |
| 2005/0258666 A1 | * | 11/2005 | Reed | 296/153 |

FOREIGN PATENT DOCUMENTS

| DE | 10 2004 008408 A1 | | 9/2005 |
| EP | 0 676 267 A | | 10/1995 |
| WO | WO 2006/060677 A | | 6/2006 |
| WO | WO 2006060677 A1 | * | 6/2006 |
| WO | WO-2006/101959 A1 | | 9/2006 |

OTHER PUBLICATIONS

International Search Report corresponding to PCT Application No. PCT/US2008/051170 dated Jul. 17, 2008, 4 pages.
Chinese Office Action and its English Translation dated Dec. 23, 2011 as received in corresponding China Application No. 200880007988.7, 4 pages.
European Office Action dated Aug. 22, 2012 as received in corresponding European Application No. 08713786.5, 7 pages.
Office Action in CA Appln No. 2,675,855 dated Apr. 17, 2013.
Notice of Preliminary Rejection mailed Oct. 23, 2013, as received in corresponding Korean Patent Application No. 10-2009-7016957.

* cited by examiner

*Primary Examiner* — Callie Shosho
*Assistant Examiner* — Patrick English
(74) *Attorney, Agent, or Firm* — Foley & Lardner LLP

(57) ABSTRACT

A method of forming a component (14) includes providing a compressible member (22), compressing the compressible member to a compressed state, coupling a skin (20) to a substrate (18) wherein the compressible member is disposed between the skin and the substrate, and expanding the compressible material (26) to an expanded state.

19 Claims, 4 Drawing Sheets

COMPONENT HAVING A CUSHIONED REGION AND METHOD FOR MAKING A COMPONENT HAVING A CUSHIONED REGION

CROSS-REFERENCE TO RELATED PATENT APPLICATIONS

The present application is a National Stage of PCT/US2008/051170, filed Jan. 16, 2008 which claims the benefit of U.S. Provisional Application No. 60/881,102, filed Jan. 18, 2007. The foregoing applications are incorporated by reference herein in their entirety.

BACKGROUND

The present invention relates generally to the field of cushioned components, and in particular, to cushioned components or articles such as vehicle trim panels and other components having at least one cushioned portion or region, and methods for making such components.

Cushioned or padded vehicle interior components such as panels (e.g., instrument panels, door panels, etc.) conventionally include a substrate made of a relatively rigid material, a relatively soft core (e.g., a foam core), and an outer surface or skin. For example, a vehicle door panel may be cushioned to provide added comfort for an occupant of a vehicle where a portion of the occupant's body interfaces or contacts the door panel (e.g., an armrest portion). Various methods of providing such cushioning are known in the art, although there are difficulties associated with such methods and such methods do not provide certain advantageous features and/or combinations of features.

For example, one difficulty in providing panels having cushioned portions is that it may be difficult to optimize the location of the cushioned portions such that the cushioned portions are provided only in areas that are directly interfaced (e.g., contacted) by an individual.

Accordingly, there is a need to provide an improved method for producing components such as panels or other structures for use in vehicles or otherwise that includes a cushioned area or section.

SUMMARY

One embodiment relates to a method of forming a component comprising providing a compressible member, compressing the compressible member to a compressed state, coupling a skin to a substrate, wherein the compressible member is disposed between the skin and the substrate, and expanding the compressible material to an expanded state.

Another embodiment relates to a method of forming a vehicle panel having a cushioned region comprising providing a compressible member, compressing the compressible member, securing the compressible member to a skin, positioning the skin and the compressible member within a mold, forming a substrate within the mold around the compressible member, wherein the compressible member is disposed between the substrate and the skin, and expanding the compressible member, wherein the cushioned region is defined by the compressible material.

Another embodiment relates to a panel having a cushioned region comprising a substrate, a skin covering at least a portion of the substrate, and a compressible member that forms a cushioned region in the skin, wherein the compressible member includes a compressible material and an enclosure that forms the cushioned region by maintaining a vacuum to compress the compressible material and permitting expansion of the compressible material after puncturing to release the vacuum.

DETAILED DESCRIPTION

Figure 1:
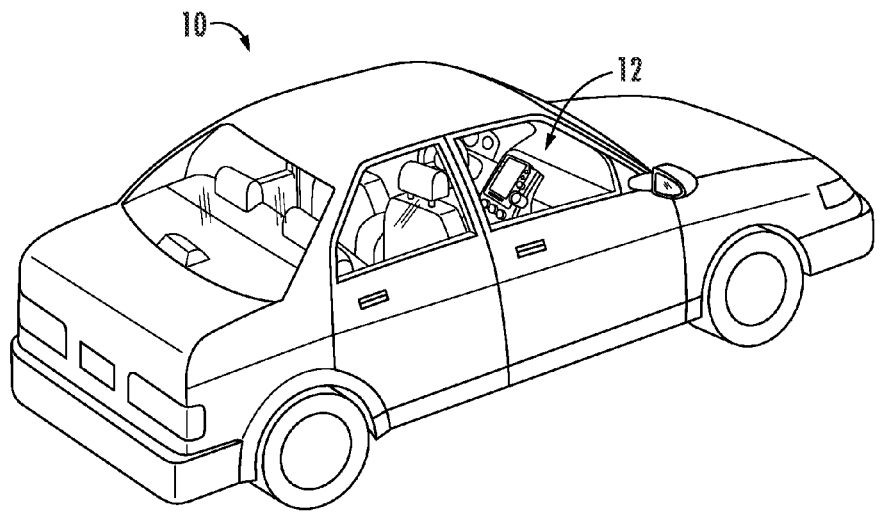
FIG. 1 is a perspective view of a vehicle having an interior according to an exemplary embodiment.
Figure 2:
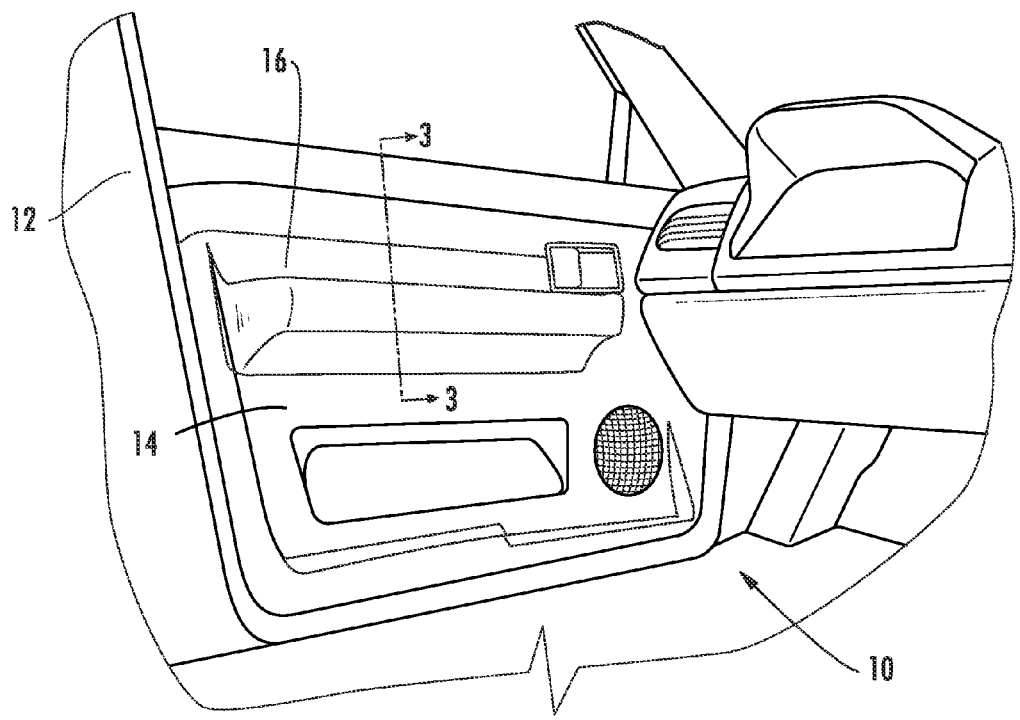
FIG. 2 is a perspective view of the interior of the vehicle of FIG. 1 having a component according to an exemplary embodiment.

Referring to FIG. 1, a vehicle 10 is shown according to an exemplary embodiment and includes an interior 12. Vehicle 10 may be any of a variety of different types of vehicles, including automobiles, recreational vehicles, buses, airplanes, etc. According to an exemplary embodiment, vehicle 10 is an automobile. As shown in FIG. 2, interior 12 is provided with a component 14 (e.g., a panel, a door panel, trim panel, trim component, etc.). While component 14 is shown as a door trim panel, component 14 may comprise a wide variety of components and be used in conjunction with a wide variety of vehicle types. According to an exemplary embodiment, component 14 includes a cushioned portion or region 16 (e.g., an armrest portion of a vehicle door panel, etc.). Cushioned region 16 may be provided on any portion of component 14 where a relatively softer feel is desired.

To provide localized cushioned portions such as cushioned region 16, one method is to form (e.g., mold) a substrate behind a foam or otherwise compressible material that has been secured to a preformed skin material. A typical mold process involves a core piece and a cavity piece that move linearly relative to each other. One difficulty with this process is that certain regions of the preformed skin material that require a cushioned region may lie out of die draw (e.g., on a surface where the cavity/core pieces of the mold are parallel with each other and parallel with the direction of movement of one or both of the cavity/core pieces). Having a cushioned material in such a region often causes problems due to the mold sections having to be opened/closed while traveling over an often relatively thick cushioned surface. Accordingly, it would be advantageous to provide a method for producing components having a cushioned region that utilizes a compressible material that may have a relatively lower (e.g., thinner) profile during a molding process, and a relatively higher (e.g., thicker) profile after the molding process.

Figure 3:
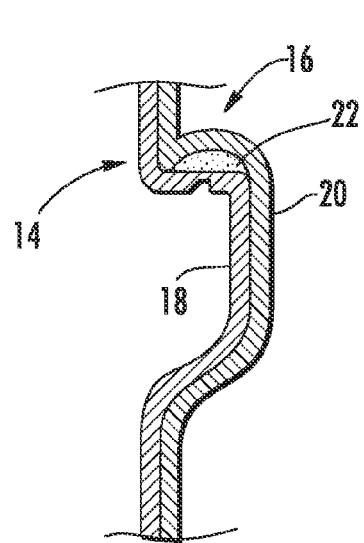
FIG. 3 is a cross-sectional view of the component of FIG. 2 taken along line 3-3 having a cushioned region defined by a compressible member according to an exemplary embodiment.

Referring now to FIG. 3, component 14 is shown in greater detail. According to an exemplary embodiment, component 14 may be a panel or other structure for use in vehicle 10. Such components may be provided in a wide variety of sizes, shapes, and configurations according to various exemplary embodiments. For example, such components may be utilized in an interior passenger compartment of a vehicle, and may find utility in the form of door panels, dashboards, instrument panels, consoles, sidewall trim, overhead liners, or other vehicle components or portions thereof.

According to an exemplary embodiment, component 14 is provided with a localized or discrete area or portion of softness or cushioning, shown as cushioned region 16 (e.g., in an area that is interfaced by a passenger of a vehicle). For example, component 14 shown in FIG. 3 may be provided as a door panel with cushioning in areas where a portion of a passenger's body are likely to contact the door (e.g., on an armrest portion, adjacent a window, etc.), yet without cushioning in the entire door (e.g., without cushioning in areas not typically contacted by passengers).

Figure 4:
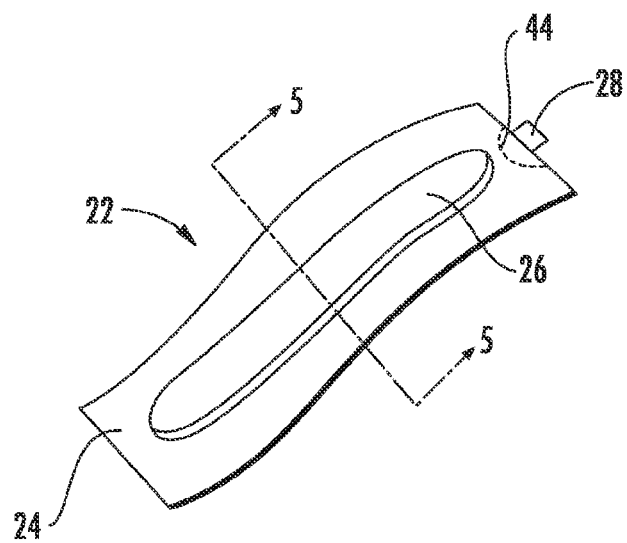
FIG. 4 is a perspective view of the compressible member of FIG. 3 according to an exemplary embodiment.

According to an exemplary embodiment, component 14 includes a member or element in the form of a relatively rigid substrate 18 (e.g., a base, stratum, etc.). Cushioned region 16 is located adjacent or proximate to at least a portion of substrate 18, and is defined by a compressible member 22 (e.g., a cushioned member, insert, etc.) provided intermediate or between substrate 18 and a skin 20 (e.g., a cover material, coverstock, cover, etc.). As shown in FIG. 4, according to one embodiment, compressible member 22 includes a compressible material 26 (e.g., a compressible component or element, foam element, etc.) contained within an enclosure 24 (e.g., a vacuum bag or enclosure, etc.).

According to various exemplary embodiments, all or part of substrate 18 may have a cushioned or padded portion such as cushioned region 16 provided adjacent thereto. For example, according to an exemplary embodiment, skin 20 may be applied adjacent substrate 18, and portions of skin 20 may be in direct contact with substrate 18, while other portions of skin 20 may be separated from substrate 18 by compressible member 22. In this manner, varying amounts or degrees of softness or cushioning may be provided at one or more localized regions (e.g., cushioned region 16) while retaining the look and feel of skin 20 even in those regions not provided with the additional cushioning of compressible member 22.

According to an exemplary embodiment, skin 20 forms at least a portion of an exterior surface (e.g., the surface visible from a passenger compartment, which is typically referred to as the "A" surface) of component 14. According to another exemplary embodiment, at least a portion of substrate 18 forms a portion of the exterior or A-surface of component 14.

According to an exemplary embodiment, skin 20 may be made of a relatively soft or flexible material comprising a polymeric material (e.g., a thermoplastic olefin (TPO), polyurethane, polyvinylchloride (PVC), etc.). According to various other embodiments, skin 20 may be made of other materials, including textiles such as cloth, leather, composite materials, layered materials (e.g., a layer of leather applied above a polymeric material layer), etc. Skin 20 may be manufactured or produced using any of a variety of processes. According to one embodiment, skin 20 may be thermoformed (e.g., vacuum-formed, pressure-formed, etc.) and then trimmed to a desired shape or configuration. According to an exemplary embodiment, skin 20 may be formed by a slush molding process. According to other exemplary embodiments, skin 20 may be manufactured according to various other methods (e.g., injection molding, extrusion, casting, etc.). Skin 20 may have a size, shape, and configuration that is adapted or configured to features included in substrate 18, and skin 20 and substrate 18 may have any number of forms that may include complex geometries.

Substrate 18 may be made of any suitable material, including any of a variety of polymers (e.g., polypropylene, polyethylene, copolymers, etc.), and may be formed in any of a wide variety of shapes, sizes, and configurations. Substrate 18 may further include a variety of other features (e.g., apertures for door handles, molded-in designs, etc.). Substrate 18 may be a stand-alone component or may be a sub-component of a larger assembly (e.g., substrate 18 may be an entire door panel or may be a portion thereof, etc.).

Compressible material 26 may be made of any suitable material, including any of a variety of foam products or otherwise compressible materials that may be compressed to a reduced thickness (e.g., a compressed state) using a vacuum or other process, and subsequently expanded to an expanded state. Any suitable material that may be compressed/expanded and that provides the desired cushioning or softness for a particular application may be used.

Enclosure 24 may be made of a plastic or other suitable material capable of maintaining a vacuum environment or otherwise containing compressible material 26 during the manufacturing and/or assembly processes described herein. According to one embodiment, enclosure 24 is a vacuum bag that may be sealed (e.g., heat-sealed, etc.) at one or more seal portions 44 (see FIG. 4) after the amount of air within enclosure 24 has been reduced. According to an alternative embodiment, enclosure 24 and compressible material 26 may be a single, integral component. Enclosure 24 may include an opening, or port, 28, configured to permit a vacuum to be applied to enclosure 24 and compressible material 26.

Figure 5:
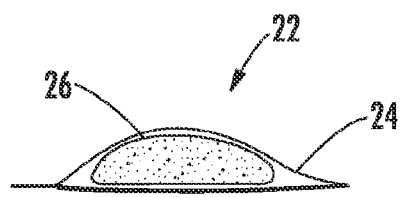
FIG. 5 is a cross-sectional view of the compressible member of FIG. 4 taken along line 5-5 in an expanded state according to an exemplary embodiment.
Figure 6:
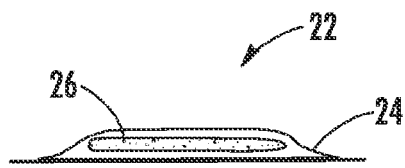
FIG. 6 is a cross-sectional view of the compressible member of FIG. 4 taken along line 5-5 in a compressed state according to an exemplary embodiment.

Referring to FIGS. 5-9, a method of forming a component such as component 14 having a compressible region such as compressible region 16 will now be described in greater detail. First, a compressible member such as compressible member 22 is provided (FIG. 5). According to an exemplary embodiment, the compressible member includes enclosure 24 and compressible material 26. As shown in FIGS. 5 and 6, the compressible material is contained within the enclosure (e.g., a plastic vacuum bag, etc.), which is capable of maintaining a vacuum environment.

After compressible material 26 is placed within enclosure 24, a vacuum is applied via a vacuum port such as vacuum port 28 shown in FIG. 4, thereby reducing the amount of air within enclosure 24 and compressing (e.g., reducing the thickness of, etc.) compressible material 26 (see FIG. 6). Vacuum port 28 is then sealed, with compressible material 26 remaining within enclosure 24 in the compressed state. Using a vacuum process such as the one described herein enables a user to compress a material such as foam to only a fraction of its expanded thickness, and permits insertion of a relatively thick foam pad into a molded part where the tool cavity is limited to only a thin insert (e.g., in the case out of die draw conditions such as in an armrest position, shown in an exemplary embodiment in FIG. 7). According to various other exemplary embodiments, other means of reducing the amount of air within enclosure 24 or otherwise compressing compressible material 26 may also be used.

Figure 7:
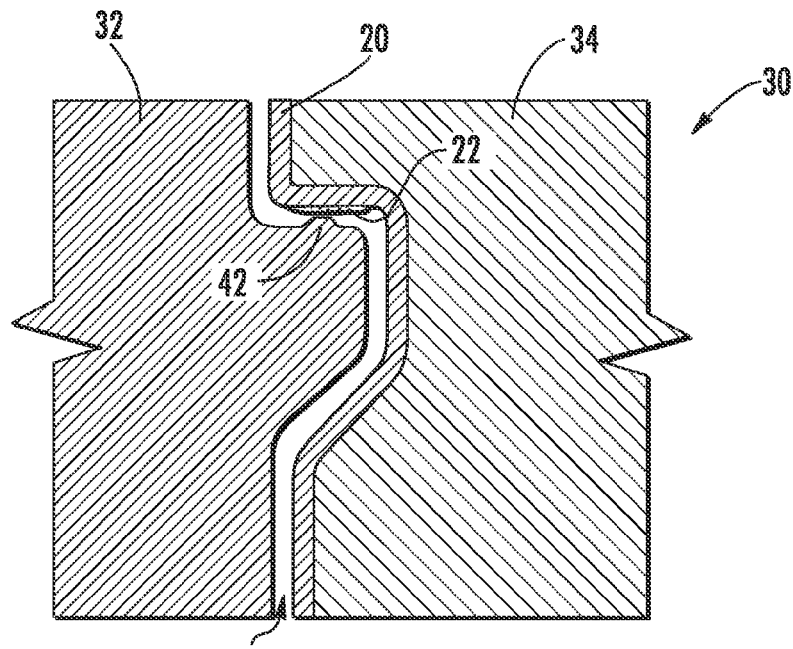
FIG. 7 is a cross-sectional view of a compressible member and a skin within a mold according to an exemplary embodiment.

Compressible member 22, with compressible material 26 therein in a compressed state, is then secured to a skin, such as skin 20 (see FIG. 7). As discussed above, skin 20 may be a flexible material, and may be pre-formed to a desired shape (e.g., to conform to the contour of a mold). Compressible member 22 may be secured to skin 20 using a variety of fastening methods, including mechanical fasteners such as clips, pins, tacks, etc., adhesives, etc.

Figures 8, 9:
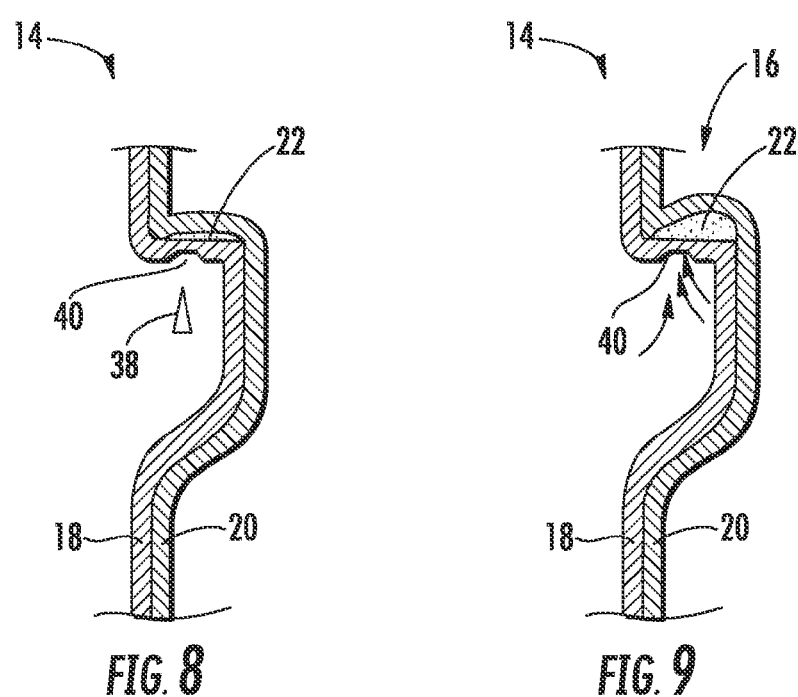
FIG. 8 is a cross-sectional view of a component having a compressible member in a compressed state according to an exemplary embodiment.
FIG. 9 is a cross-sectional view of a component having a compressible member is an expanded state according to an exemplary embodiment.

Once compressible member 22 is secured to skin 20, skin 20 and compressible member 22 are placed into a mold, such as mold 30 shown in FIG. 7. Mold 30 comprises a cavity portion 34 and core portion 32 having generally corresponding contours. Mold 30 is closed around skin 20 and compressible member 22 to create a gap 36, and a substrate material in the form of a molten resin is injected into gap 36 behind skin 20 and compressible member 22 to form substrate 18. As shown in FIG. 7, providing compressible member 22 in a compressed state reduces the profile of compressible member 22 and skin 20 at an area (e.g., cushioned region 16) that is out of die draw (e.g., a surface essentially parallel to the direction of movement of the mold pieces, such as an armrest portion of a door panel), thereby reducing the potential for damage to the various components as mold portions 32, 34 move across the surface of skin 20 in the area of compressible member 22. As shown in FIG. 7, core 32 may comprise a raised portion 42 that is configured to produce a corresponding recessed area 40 (e.g., an indent, aperture, etc.) in substrate 18. As shown in FIG. 8, recessed area 40 may be an area of reduced material thickness relative to the surrounding areas of substrate 18, and may include one or more apertures, or holes. As discussed in more detail below, recessed area 40 is provided in an area adjacent compressible member 22 such that a puncturing tool 38 (see FIG. 8) may be used to pierce or puncture substrate 18 and/or enclosure 24.

After molding or forming substrate 18, component 14 is removed from mold 30, with compressible member 22 still in the compressed state, as shown in FIG. 8. Referring to FIG. 8, puncturing tool 38 may be used to pierce or puncture substrate 18 and/or enclosure 24. Upon puncturing enclosure 24, air is allowed to enter enclosure 24, thereby expanding compressible material 26 to an expanded state. While FIG. 8 shows puncturing tool 38 being used in conjunction with recessed area 40 molded into substrate 18, various other ways of releasing the vacuum within enclosure 24 or otherwise expanding compressible material 26 may be used. For example, according to one embodiment, substrate 18 may be die cut in a post-molding operation (e.g., to provide for access holes, etc.), and the die cutting operation may include tooling configured to puncture substrate 18 and/or enclosure 24.

Referring to FIG. 9, once compressible material 26 is permitted to expand, a cushioned area, such as cushioned region 16, of component 14 is formed. As shown in FIG. 9, cushioned region 16 may comprise only a portion of the area of component 14 covered by skin 20. According to an alternative embodiment, the entire surface of component 14 may be provided as cushioned or padded.

Figure 10:
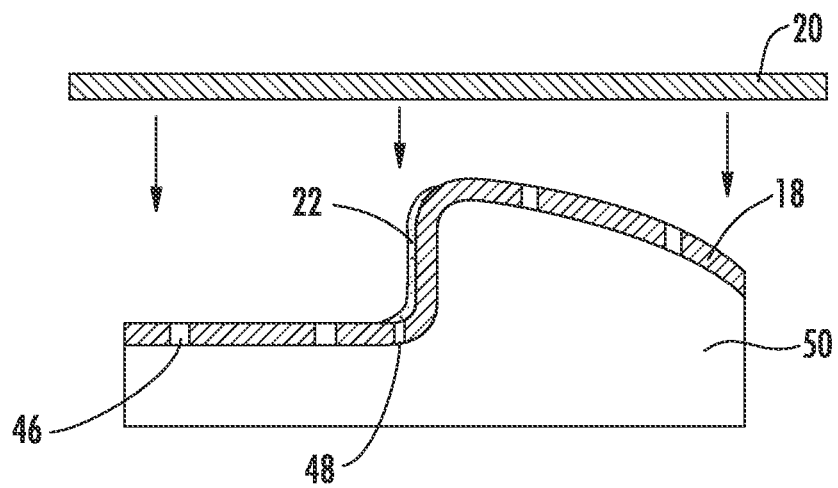
FIG. 10 is a cross-sectional view of various portions of a component and a mold according to an exemplary embodiment.
Figure 11:
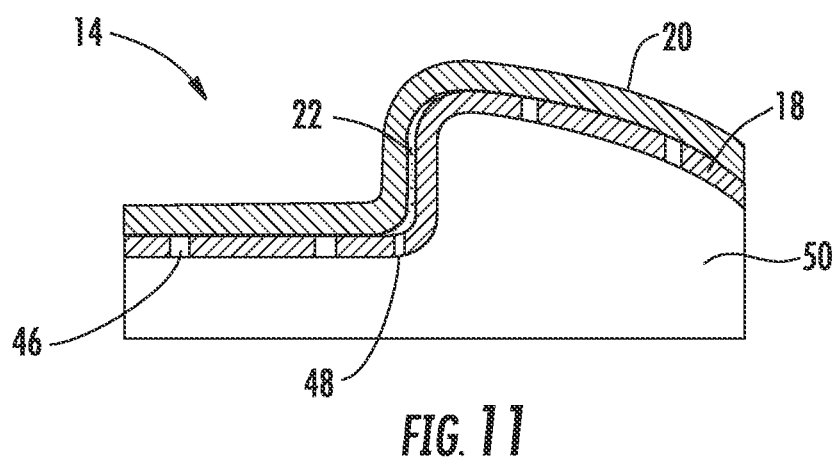
FIG. 11 is a cross-sectional view of a component having a compressible member in a compressed state and a mold according to an exemplary embodiment.
Figure 12:
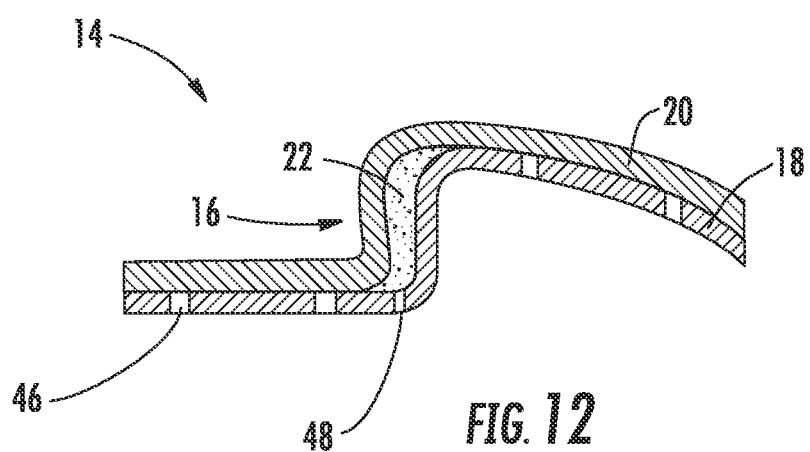
FIG. 12 is a cross-sectional view of a component having a compressible member in an expanded state.

As discussed with respect to the FIGURES, compressible member 22 is used in a molding process such as a partial mold behind (PMB) process to form a panel or other component such as component 14. According to various alternative embodiments, compressible member 22 may be used in other applications. For example, referring to FIGS. 10-12, compressible member 22 may be attached in the compressed state to a pre-formed substrate material such as substrate 18 using, for example, an adhesive or mechanical fastener, and skin 20 may then be vacuum wrapped (e.g., vacuum-formed, etc.) around substrate 18 and compressible member 22 using a vacuum-forming mold 50, resulting in component 14 shown in FIG. 11. (e.g., a component including a compressed material between a substrate and a skin). According to an exemplary embodiment, substrate 18 may include one or more apertures 46 that permit a vacuum to be applied to skin 20 (FIG. 10) that acts to pull skin 20 over compressible member 22 and substrate 18 (FIG. 11). Compressible member 22 may then be punctured or otherwise expanded using any of the methods disclosed herein to permit compressible member 22 to expand (see FIG. 12). According to an exemplary embodiment, substrate 18 may include a recess 48 (e.g., aperture, area of reduced thickness, etc.) configured to facilitate puncturing of compressible member 22. Furthermore, the techniques disclosed herein may be applicable to other processes and components according to various other embodiments (e.g., textile-wrapped components, such as seats, head rests, visors, etc., floor consoles, etc.).

It is important to note that the construction and arrangement of the component and method of making the component as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present disclosure. The order or sequence of any process or method steps may be varied or resequenced according to alternative embodiments. Other substitutions, modifications, changes, and omissions may be made in the design, operating conditions, and arrangement of the exemplary embodiments, without departing from the scope of the present disclosure.

What is claimed is:

1. A vehicle panel, comprising:
   a substrate having an inner surface and an outer surface forming a first portion, a second portion that extends upwardly from the first portion, and a third portion that extends downwardly from the first portion;
   a skin having an outer surface and an inner surface abutting outer surfaces of the second and third portions of the substrate;
   a compressible member disposed between the outer surface of the first portion of the substrate and the inner surface of the skin, the compressible member comprising:
      a compressible material; and
      an enclosure comprising a layer surrounding the compressible material;
   wherein the enclosure is a sealed vacuum bag.

2. The vehicle panel of claim 1, wherein the second portion extends upwardly from a first end of the first portion, and wherein the third portion extends downwardly from a second end of the first portion.

3. The vehicle panel of claim 1, wherein the enclosure includes a port configured to selectively permit air to pass therethrough.

4. The vehicle panel of claim 1, wherein the substrate includes a recess provided adjacent to the enclosure.

5. The vehicle panel of claim 4, wherein the recess includes an aperture configured to provide access to the enclosure.

6. The vehicle panel of claim 4, wherein the sealed vacuum bag is sealed at a seal portion.

7. The vehicle panel of claim 1, wherein at least a portion of the outer surface of the skin forms a first portion of an "A" surface of the panel and at least a portion of the outer surface of the substrate forms a second portion of an "A" surface of the panel.

8. The vehicle panel of claim 7, wherein the panel is selected from a group consisting of a door panel, a dashboard, an instrument panel, a console, a sidewall trim panel, and an overhead liner.

9. The vehicle panel of claim 1, wherein the compressible member is secured to the skin.

10. The vehicle panel of claim 9, wherein an adhesive is disposed between the skin and the compressible member, such that the compressible member is secured to the skin by the adhesive.

11. The vehicle panel of claim 10, wherein a second adhesive is disposed between the substrate and the compressible member, such that the compressible member is secured to the substrate by the second adhesive.

12. The vehicle panel of claim 9, wherein a clip, a pin, or a tack is used to secure the skin and the compressible member together.

13. The vehicle panel of claim 9, wherein the compressible member is secured to the substrate.

14. The vehicle panel of claim 13, wherein an adhesive is disposed between the substrate and the compressible member, such that the compressible member is secured to the substrate by the adhesive.

15. The vehicle panel of claim 13, wherein a clip, a pin, or a tack is used to secure the substrate and the compressible member together.

16. The vehicle panel of claim 1, wherein the compressible member is secured to the substrate.

17. The vehicle panel of claim 1, wherein the substrate includes a recessed area in the inner surface adjacent the compressible member.

18. The vehicle panel of claim 17, wherein the recessed area has a material thickness that is less than a material thickness of adjacent portions of the substrate surrounding the recessed area.

19. The vehicle panel of claim 17, wherein the recessed area extends from the inner surface of the substrate toward the outer surface of the substrate a depth that is less than a thickness between the inner and outer surfaces.

* * * * *